INVENTORS
Marvin J. Seven
Harry J. Venema
Raymond P. Seven

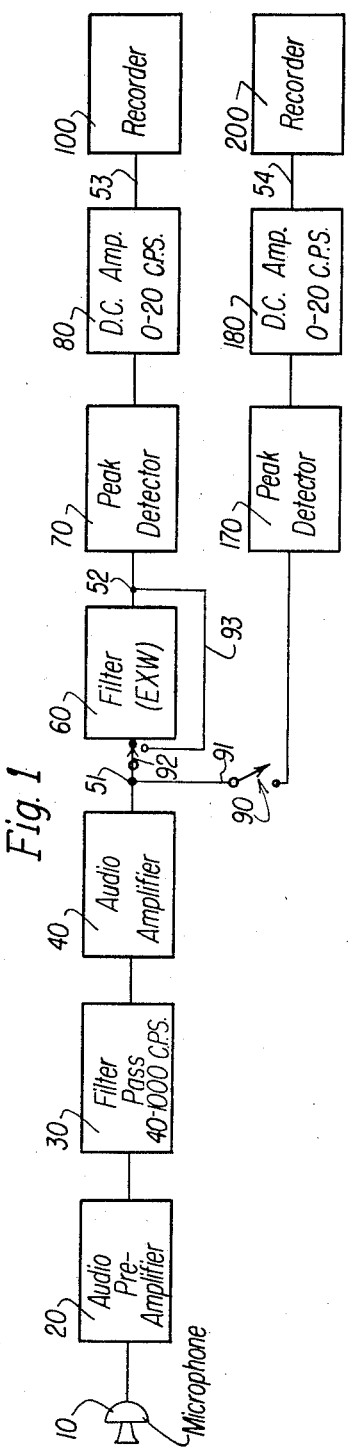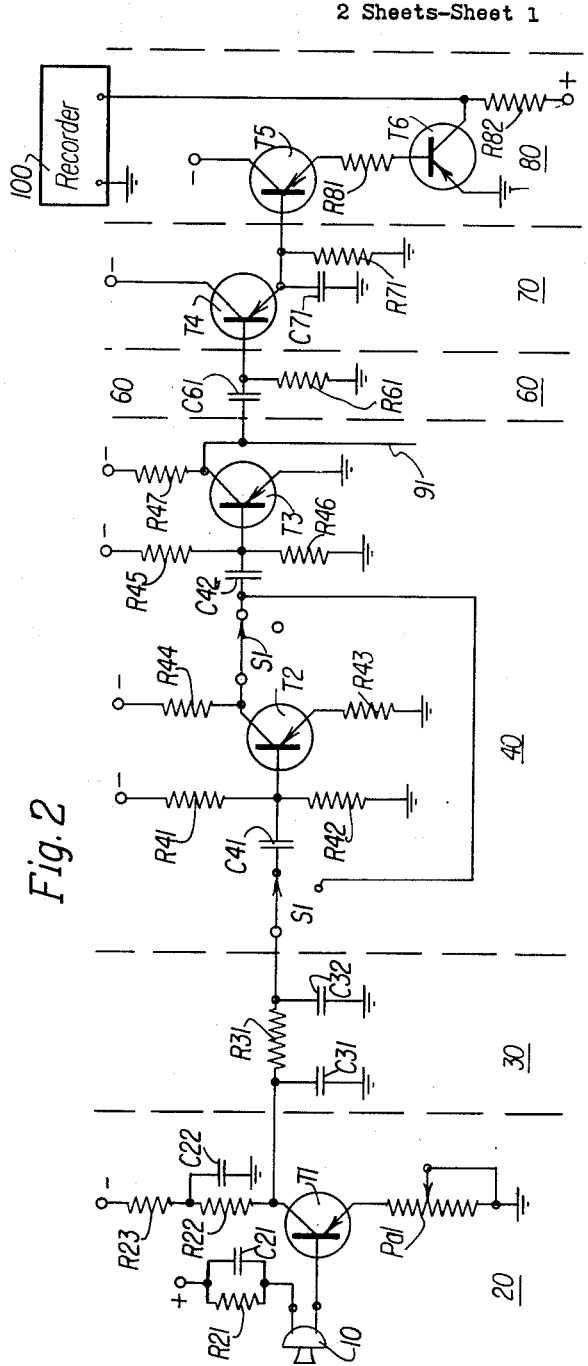

United States Patent Office 3,052,756
Patented Sept. 4, 1962

3,052,756
PHONOCARDIOGRAPHY APPARATUS
Marvin J. Seven, 233 S. 42nd St., Philadelphia, Pa., and Raymond P. Seven, 921 Wakeman Ave., and Harry J. Venema, 1908 Driving Park Road, both of Wheaton, Ill.
Filed July 10, 1958, Ser. No. 747,739
8 Claims. (Cl. 179—1)

Listening to heart sounds by a stethoscope has played an important part in the diagnosis of heart malfunctions. In many cases it has been found desirable to make a permanent record of heart sounds for future reference, or for a more detailed examination. Heart sounds have often been recorded on phonographic records, or on sound tape for future sound reproduction.

Heart sounds have also been studied by means of an oscilloscope and permanent oscillograph tracings have been made by a photographic process of recording the vertical pertubations of the electron beam as a function of time so that a permanent tracing has been obtained of the instantaneous sound pressures as a function time. In general, the equipment required for this permanent recording of heart sounds, commonly known as phonocardiography, has been too expensive and unadaptable for use by the general medical practitioner. It has also suffered from the disadvantage of requiring a chemical development of the light-sensitive film so that some time elapsed between the act of recording and observation of the record obtained.

A further disadvantage of this conventional phonocardiography is that the numerous oscillations set up by a "single" sound coming from the heart make it very difficult to distinguish two or more distinct sounds occurring close together in time. It is thus true that more "information" is being recorded than is absolutely necessary for adequate diagnosis of abnormal heart conditions.

Normal heart sounds occur in the range of 40 to 160 cycles per second with abnormal sound (murmurs) generally occurring in the range of 40 to 1000 cycles per second. Although direct-writing recorders are available, they generally will not record above 200 cycles per second and they have generally been regarded as unsuitable for the recording of heart sounds.

It is an object of this invention to describe a new simplified method and apparatus for recording heart sounds, normal, and abnormal. It is further an object of this invention to describe the electronic circuit which will enable the direct-recording of heart sounds on a direct-writing recorder, even though the recorder may not have a response greater than above 20 cycles per second. It is further an object of this invention to provide a simple, easily interpreted record of heart sounds by direct writing with no delay required for "development" of the recording. A further object is to provide a clear visual tracing of heart sounds that will not be confused by the recording of unnecessary information. Further objects and advantages of this invention will become evident as the description proceeds and from an examination of the accompanying drawing which illustrates one embodiment of the invention.

In the drawings:

FIGURE 1 is a block diagram of the system embodying the present invention;

FIGURE 2 is a schemtaic diagram of the various circuits employed in the system of the present invention.

Figure 3A:
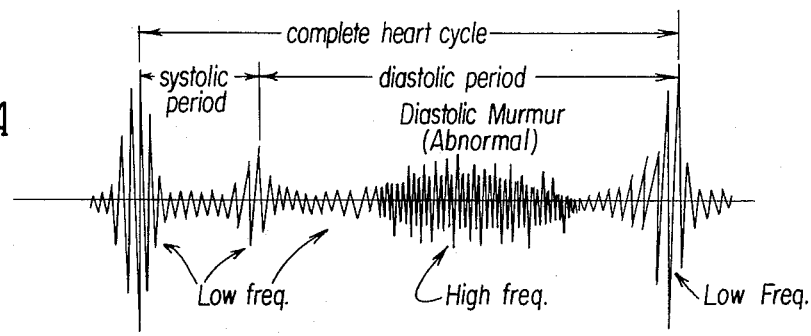
FIGURES 3A, 3B, 3C and 3D show the wave forms that appear at the various stages in the system.

Referring now to FIGURE 1, the information received by the microphone 10 is fed to audio pre-amplifier 20 which is of the low impedance type in order to match the impedance of the microphone.

Next, the information enters a filter 30 designed to pass 40 to 1000 cycles per second. When the microphone is placed on a human chest many extraneous sounds are picked up that are not useful for diagnosing heart conditions. For example, there are sounds of muscle action or of friction between the skin and microphone which are unimportant. However, the heart sounds, which occur in the ranges of 40 to 1000 cycles per second, are passed by this filter.

Following the filter, the information is again amplified by an audio amplifier 40 in one or more stages. This amplifier may be provided with a gain control.

The character of the sound emitted from the heart is a combination of amplitude and frequency modulation. The information that exists in such a system is equal to the sum of the side bands of the amplitude modulation and the frequency modulation. The side bands appear to have a band width of approximately 10 cycles per second each. The total band width system of 20 cycles per second should be adequate for describing completely the normal or abnormal action of the heart.

It would be ideal to record the frequency modulation and the amplitude modulation. In practise however, it is difficult to separate the frequency modulation from the amplitude modulation except by means of a wide band peak detector. By means of two recording systems as shown in FIGURE 1 it is possible to present a modulation which is the product of amplitude and frequency ($E \times W$) on one record and the amplitude modulation ($E$) on another record. Thus all the available information can be recorded on a direct-writing recorder. In most cases sufficient diagnostic evidence can be obtained from recording the ($E \times W$) modulation.

As shown in the diagram of FIGURE 1, after leaving the audio amplifier 40, the information is introduced into two parallel circuits for separate recording of the amplitude and frequency modulation, as shown in the top branch; and of the amplitude modulation, as shown in the lower branch.

Referring now to the top branch for recording amplitude and frequency modulation, the filter 60 is a differentiating network. The information that passes the filter 60 next enters a peak detector 70 which must only handle frequencies of 0 to 20 cycles per second. Following the peak detector 70, the signals are amplified by a low frequency amplifier 80 after which it is recorded on a direct writing recorder 100.

The bottom branch in FIG. 1 is for recording amplitude modulations and includes a peak detector 170, identical to the peak detector 70, a D.C. amplifier 180, identical to the amplifier 80, and a recorder 200, identical to the recorder 100. The lower branch is selectively switched in and out of the system by means of a switch 90, in conductor 91.

Referring now to FIGURE 2, there is shown a diagram of a circuit embodied in the device of the invention. The audio preamplifier 20 is a standard low impedance type having a transistor $T_1$, a resistor $R_{21}$ and capacitor $C_{21}$ forming a biasing circuit for $T_1$. $R_{22}$ is the load collector resistor and $R_{23}$ and $C_{22}$ form an isolating network required to buffer this stage from the rest of the B line. $P_{21}$ is a resistive potentiometer and is used as a control on the gain of this preamplifying stage.

Connected to the output of the transistor $T_1$ is a filter 30 designed to pass 40 to 1000 cycles per second. This is a conventional Pi filter known to workers in this field. The Pi network is made up of capacitors $C_{31}$ and $C_{32}$ and the resistance $R_{31}$.

The filter 30 is coupled to the audio amplifier 40 through switch $S_1$. This switch enables the audio amplifier 40 to be made up of either one or two stages depending on the position of the switch. Capacitors $C_{41}$ and $C_{42}$ are coupling capacitors. Resistors $R_{41}$, $R_{42}$, $R_{45}$ and $R_{46}$ are used to bias the transistors $T_2$ and $T_3$ at specific operating points. $R_{44}$ and $R_{47}$ are collector load resistors for transistors $T_2$ and $T_3$. Resistance $R_{43}$ is an emitter resistance used to add degeneration feed-back to enhance the stability of the amplifier.

The filter 60 is a simple differentiating network comprised of a capacitor $C_{61}$ and resistor $R_{61}$. The output of such a filter is equal to $(E \times W)RC$ where E is the amplitude of the input signal, W is the frequency of the input signal in radians per second, R is the value of the resistor and C is the value of the capacitor.

The peak detector 70 is made up of transistor $T_4$ being the non-linear element and the capacitor $C_{71}$ and resistance $R_{71}$ combining to store and smooth the signal that is being detected.

The D.C. amplifier 80 employs transistors $T_5$ and $T_6$. Transistor $T_5$ is used to transform impedance from a high impedance to a low impedance. $R_{81}$ is a coupling resistance which adds impedance and buffers the power transistors $T_6$ from $T_5$. $R_{82}$ is the collector load resistor.

Figure 3B:
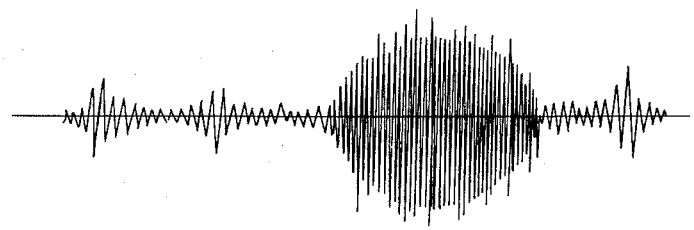
Figure 3C:
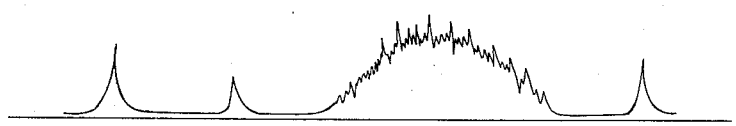

Recorders 100 and 200 are ordinary pen writing recorders having frequency responses from 0 to 20 cycles per second, or better. A suitable recorder is Model BL-202 manufactured by Brush Electronics Co. of Cleveland, Ohio. Operation of this phonocardiograph is simple since it involves the use of only a microphone, an amplifier filter and peak detector system in accordance with the invention for supplying information to a direct pen-writing recorder. In use, the microphone is placed on the chest of the subject in standard areas of auscultation, or areas selected by simultaneous auscultation with a stethoscope. Assuming a heartbeat including, for example, an abnormal sound such as a diastolic murmur, the amplitude signal from the microphone 10 will appear at the output 51 of the audio amplifier 40 as a wave form such as shown in FIGURE 3A. Specifically, the wave form will include low frequency sounds characteristic of the normal heartbeat which vary in amplitude during the systolic period. Abnormal sounds, such as a diastolic murmur, often have higher frequency components and will vary in amplitude in accordance with the abnormality. This signal is applied to the filter 60 in the upper branch and at the output 52 of the filter 60, the wave form will appear as shown in FIGURE 3B. Therein the low frequency signals characteristic of the normal sounds have been attenuated relative to the high frequency signals characteristic of the abnormal sounds. Accordingly, the abnormal sounds of high frequencies are accentuated and presented for more easy detection by the medical examiner. This signal is then fed through the peak detector 70 and the D.C. amplifier 80 and appears in the output 53 of the latter in the wave form as shown in FIGURE 3C. As illustrated therein, the signal at junction 53 between the amplifier 80 and the direct pen writing recorder 100 is the amplitude detected envelope of the frequencies making up the heart sound. This envelope, while it might be descriptive of sounds having frequencies up to 1000 cycles, is defined by D.C. pulsations having frequencies of not greater than 20 cycles per second. These pulsations are well within the capacity of a direct writing pen type recorder and are thus easily and conveniently reproduced.

Figure 3D:

In the lower branch of the system shown in FIGURE 1 the signal of FIGURE 3A appearing at the junction 51 is applied through the switch 90 to the peak detector 70 wherein the envelope of the signal is detected and applied through the D.C. amplifier 180 to the recorder 200. At the junction between the amplifier 180 and the recorder 200, the signal appears as shown in FIGURE 3D. In this instance, it is noted that the relative amplitudes between the peaks of the systolic period and the diastolic murmur is maintained independent of the frequency of the sound source. By comparison of the outputs of the recorders 100 and 200 the medical examiner is provided with additional information, for example, that the abnormal sound occurrent during the diastolic period is of a higher frequency characteristic. This comparison can also be facilitated without the use of the lower branch in FIGURE 1 by employing a shunt for the filter 60 including the switch 92 and conductor 93 whereby the filter 60 is selectively by-passed in the upper branch.

In the operation of the phonocardiograph, the medical examiner may employ a variety of bells, or diaphragms to enhance or filter certain frequencies. These devices are applied with a degree of pressure selected by the examiner, depending on the response observed in the moving pen and the characteristic which it is desired to observe in greater detail. The subject may also be positioned in a variety of standard cardiologic maneuvers to enhance certain sounds and murmurs and instructed to vary the degrees of inspiration and expiration as they may affect the transmission of sounds. The responses may be modified by the adjustments on the amplifier-filter to enhance or diminish deflections on the recorder. The latter recording apparatus may be run at a number of speeds selected by the examiner to bring out more detailed responses and facilitate measurement of sound intervals.

Normal heart sounds may be identified at a variety of speeds. Arrhythmias are readily detected by obvious changes in the normal heart sound cycle. Both systolic and diastolic murmurs may be detected by deflections in the appropriate intervals between sounds. The absence of an oscillating base line permits ease of timing and measurement of duration of murmurs. Technical assistance is not required in the operation of this machine.

In view of the foregoing, it is appreciated that there has been provided an improved phonocardiograph system and method including a peak detector circuit which provides an output limited in frequencies to not more than 20 cycles per second and particularly well adapted for use with pen writing recorders. An advantage of the system is that it makes available to the medical practitioner stable and inexpensive equipment easily adapted for use in a medical office. The system so provided permits the medical practitioner to make a visual and permanent recording of the heart sounds without the use of complex equipment or performing any developing operations.

Though the embodiment described herein is at present considered to be preferred, it is understood that variations and modifications may be made therein. Specifically, the circuit is adaptable to electron tubes as well as transistors and the frequency filter may be made adjustable for purposes of selecting certain frequency ranges. Other modifications may be made by those skilled in the art and it is intended to cover in the appended claims all such variations and modifications as fall within the true spirit and scope of the invention.

What is claimed is:

1. A phonocardiograph comprising a microphone for receiving heart sounds of the body and for providing electrical undulations corresponding to the heart sounds of both normal and abnormal frequencies, means associated with said microphone for amplifying said electrical undulations containing normal and abnormal frequencies including abnormal frequencies above 160 cycles per second, detector means for producing a variable signal corresponding to the amplitude envelope of said amplified electrical undulations, and recorder means for recording said variable signal.

2. A phonocardiograph comprising a microphone for receiving heart sounds of the body and for providing electrical undulations corresponding to the heart sounds of both normal and abnormal frequencies, means associated with said microphone for amplifying said electrical undulations containing normal and abnormal frequencies including abnormal frequencies above 160 cycles per second, detector means for producing a variable signal corresponding to the amplitude envelope of said electrical undulations, and means for including a stylus for recording said variable signal.

3. A phonocardiograph comprising a microphone for receiving heart sounds of the body and for providing electrical undulations corresponding to the heart sounds of both normal and abnormal frequencies, means associated with said microphone for amplifying said electrical undulations containing normal and abnormal frequencies included within the range from about 40 to about 1000 cycles per second, detector means operatively associated with said amplifying means for producing a variable signal corresponding to the amplitude envelope of said amplified electrical undulations, and writing means including a stylus for recording said variable signal.

4. A phonocardiograph comprising a microphone for receiving heart sounds of the body and for providing electrical undulations corresponding to the heart sounds of both normal and abnormal frequencies, means associated with said microphone for amplifying said electrical undulations containing normal and abnormal frequencies including abnormal frequencies above 160 cycles per second, filter means receiving said electrical undulations for attenuating the lower frequency components relative to higher frequency components thereof, means detecting said amplified and filtered electrical undulations for producing variable signals corresponding to the amplitude envelope thereof, and writing means associated with said detector means for recording said variable signal.

5. A phonocardiograph comprising a microphone for receiving heart sounds of the body and for providing electrical undulations corresponding to the heart sounds of both normal and abnormal frequencies, means associated with said microphone for amplifying said electrical undulations of a range of frequencies containing normal and abnormal frequencies including abnormal frequencies above 160 cycles per second, filter means associated with said microphone for attenuating the lower frequency components of said undulations in order to distort according to frequency the amplitudes of said electrical undulations, detector means for producing a variable signal corresponding to the amplitude envelope of said range of frequencies, writing means including a stylus for recording variable signals from said detector means, and means for selectively applying to said detector means distorted and non-distorted electrical undulations whereby a comparative record is made of the heart sound according to frequency and according to amplitude.

6. A phonocardiograph comprising a microphone for receiving heart sounds of the body and for providing electrical undulations corresponding to the heart sounds of both normal and abnormal frequencies, means for amplifying said electrical undulations including frequencies between about 40 to about 1000 cycles per second, detector means for providing a variable signal including a variable component having a frequency band up to approximately 20 cycles per second and corresponding to the amplitude envelope of said filtered undulations, and stylus writing means for recording said variable signal.

7. A phonocardiograph comprising a microphone for receiving heart sounds of the body and for providing electrical undulations corresponding to low frequency normal heart sounds and high frequency abnormal heart sounds, means for amplifying said electrical undulations including frequencies between about 40 to about 1000 cycles per second, means for detecting the amplitude envelope of said electrical undulations for providing a signal including a variable component having a frequency band up to approximately 20 cycles per second, and a pen writing recorder for producing a record of said variable signal.

8. A phonocardiograph comprising a microphone for receiving heart sounds of the body and for providing electrical undulations corresponding to the heart sounds of both normal and abnormal frequencies, means for amplifying said electrical undulations including abnormal frequencies above 160 cycles per second, means for detecting the amplitude envelope of said electrical undulations for providing a signal including a variable component having a frequency band up to approximately 20 cycles per second, and writing means including a stylus for producing a record of said variable signal.

References Cited in the file of this patent

UNITED STATES PATENTS

| | | |
|---|---|---|
| 1,686,504 | Dodge et al. | Oct. 2, 1928 |
| 1,829,267 | Duchosal | Oct. 27, 1931 |
| 2,689,161 | Marchand et al. | Sept. 14, 1954 |